(12) United States Patent
Nagayama et al.

(10) Patent No.: US 11,870,794 B2
(45) Date of Patent: Jan. 9, 2024

(54) SPECIFYING DEVICE, SPECIFYING METHOD, AND SPECIFYING PROGRAM

(71) Applicant: NIPPON TELEGRAPH AND TELEPHONE CORPORATION, Tokyo (JP)

(72) Inventors: Hiroki Nagayama, Tokyo (JP); Bo Hu, Tokyo (JP); Kazunori Kamiya, Tokyo (JP); Yukio Nagafuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 621 days.

(21) Appl. No.: 17/057,514

(22) PCT Filed: May 23, 2019

(86) PCT No.: PCT/JP2019/020526
§ 371 (c)(1),
(2) Date: Nov. 20, 2020

(87) PCT Pub. No.: WO2019/225710
PCT Pub. Date: Nov. 28, 2019

(65) Prior Publication Data
US 2021/0203660 A1 Jul. 1, 2021

(30) Foreign Application Priority Data

May 25, 2018 (JP) ................................ 2018-100848

(51) Int. Cl.
*H04L 9/40* (2022.01)
*H04L 61/103* (2022.01)
*H04L 41/14* (2022.01)

(52) U.S. Cl.
CPC ........ *H04L 63/1425* (2013.01); *H04L 41/145* (2013.01); *H04L 61/103* (2013.01); *H04L 63/101* (2013.01)

(58) Field of Classification Search
CPC . H04L 63/1425; H04L 41/145; H04L 61/103; H04L 63/101; H04L 2101/622; H04W 24/08
See application file for complete search history.

(56) References Cited

U.S. PATENT DOCUMENTS

2012/0137367 A1* 5/2012 Dupont ................... G06F 21/00
726/25
2017/0279838 A1* 9/2017 Dasgupta ............ H04L 63/1425

OTHER PUBLICATIONS

Watanabe et al. (2002) "Outlier Detection Based on Decision Tree and Boosting," The 16th Annual Conference of Japanese Society for Artificial Intelligence, vol. 16, No. 1, pp. 1A3-04.1-1A3-04.4.

* cited by examiner

*Primary Examiner* — Huan V Doan

(57) ABSTRACT

An identifying device (10) includes a preprocessing (11) that extracts a communication connection pattern including a set of a communication source identifier and a communication destination identifier from traffic data, a comparing unit (131) that adds an ID to a communication connection pattern group including a new communication connection pattern not included in a whitelist when the new communication connection pattern is present in the communication connection pattern group, a graph feature amount generating unit (14) that generates a graph feature amount of the communication connection pattern group to which the ID has been added and adds this ID to the graph feature amount, an abnormality determining unit (16) that determines whether the generated graph feature amount is normal using a model (161) having learned the graph feature amount, and an identifying unit (132) that retrieves a new communication.

(Continued)

connection pattern corresponding to the ID of the graph feature amount determined to have an abnormality from the communication connection pattern group including the new communication connection pattern and identifies the retrieved new communication connection pattern as communication that causes the abnormality.

20 Claims, 7 Drawing Sheets

SPECIFYING DEVICE, SPECIFYING METHOD, AND SPECIFYING PROGRAM

Cross-Reference to Related Applications

This application is a U.S. 371 Application of International Patent Application No. PCT/JP2019/020526, filed on 23 May 2019, which application claims priority to and the benefit of JP Application No. 2018-100848, filed on 25 May 2018, the disclosures of which are hereby incorporated herein by reference in their entireties.

TECHNICAL FIELD

The present, invention relates to an identifying device, an identifying method, and an identifying program.

BACKGROUND ART

There is a network abnormality detecting technique that uses machine learning such as a neural network or a support vector machine. Generally, abnormality detection using machine learning has difficulty in identifying the cause during occurrence of an abnormality.

Accordingly, there is proposed a prior-art method that uses a decision tree, which is a machine learning method with high interpretability, to identify the combination of feature amounts that is the cause during detection of an abnormality and the conditions for branching to an abnormality decision (see NPL 1).

CITATION LIST

Non Patent Literature

[NPL 1] Takeshi Watanabe et al., "Outlier Detection Based on Decision Tree and Boosting", Proceedings of Annual Conference of The Japanese a Society of Artificial Intelligence, vol. 16, no. 1, pp. 1A3.04.1-1A3.04.4, May 2002.

SUMMARY OF THE INVENTION

Technical Problem

However, when an abnormality of network traffic is detected using the decision target as a graph feature amount, even if the graph feature amount having caused an abnormality can be identified, it is difficult to derive the abnormality-causing communication in an actual network based on the graph feature amount having caused the abnormality because interpretation of the feature amount is often complicated. Accordingly, when an abnormality of network traffic is detected using a graph feature amount, the communication that causes an abnormality needs to be identified more easily.

The present invention addresses the above problems with an object of providing an identifying device, an identifying method, and an identifying program that can easily identify the communication that causes an abnormality.

Means for Solving the Problem

To solve the problems described above and achieve the object, an identifying device according to the present invention includes a preprocessing unit that obtains traffic data and extracts, from the obtained traffic data, a communication connection pattern including a set of a communication source identifier for identifying a host of a communication source and a communication destination identifier for identifying a host of a communication destination; a comparing unit that compares a whitelist including a communication connection pattern of traffic data of normal communication with a communication connection pattern group extracted by the preprocessing unit and, when a new communication connection pattern not included in the whitelist is present in the communication connection pattern group, adds an ID to the communication connection pattern group including the new communication connection pattern; a generating unit that generates a graph feature amount based on the communication connection pattern group to which the ID has been added by the comparing unit and adds, to the generated graph feature amount, an ID identical to the ID added to the communication connection pattern group; a determining unit that determines whether the graph feature amount generated by the generating unit is normal using a model having learned the graph feature amount that is based on the communication connection pattern; and an identifying unit that retrieves a new communication connection pattern corresponding to the ID of the graph feature amount determined to have an abnormality by the determining unit from the communication connection pattern group including the new communication connection pattern and identifies the retrieved new communication connection pattern as communication that causes the abnormality.

Effects of the Invention

According to the present invention, the communication that causes an abnormality can be identified easily.

DESCRIPTION OF EMBODIMENTS

Figure 1:
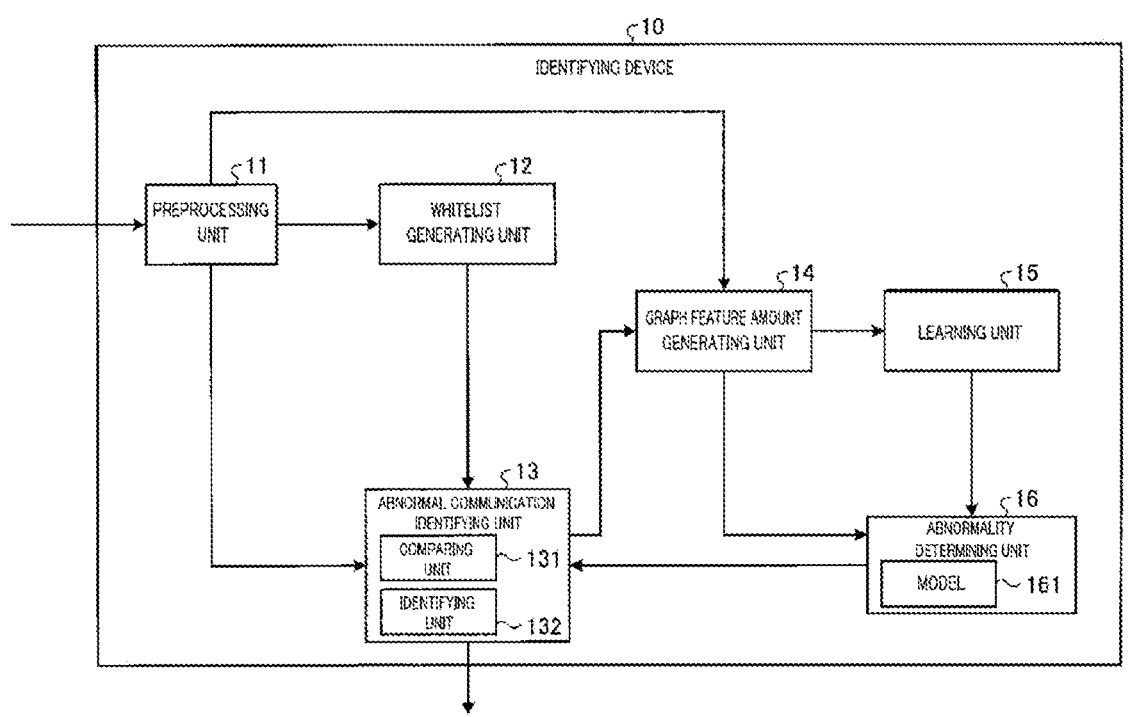
FIG. 1 shows an example of the structure of an identifying device according to an embodiment.

An embodiment of the present invention will be described in detail below with reference to the drawings. It should be noted here that the present invention is not limited to this embodiment. in addition, identical components are denoted by identical reference numerals in the drawings.

Embodiment

First, an embodiment of the present invention will be described. FIG. 1 shows an example of the structure of an identifying device according to the embodiment.

As shown in FIG. 1, an identifying device 10 according to the embodiment includes a preprocessing unit 11, a whitelist generating unit 12, an abnormal communication identifying unit 13, a graph feature amount generating unit 14 (generating unit), a learning unit 15, and an abnormality determining unit 16 (determining unit). The identifying device 10 is achieved by, for example, causing a computer or the like including a ROM (Read Only Memory), a RAM (Random Access Memory), a flash memory, a CPU (Central Processing Unit), and the like to read a predetermined program and causing the CPU to execute the predetermined program.

The preprocessing unit 11 obtains traffic data and extracts, from the obtained traffic data, a communication. connection pattern including a set of a communication source identifier for identifying the host of the communication source and a communication destination identifier for identifying the host of the communication destination identifier. At the time of learning, the preprocessing unit 11 obtains learning traffic data of normal communication and extracts a communication connection pattern from the obtained learning traffic data. When identifying a communication abnormality, the preprocessing unit 11 obtains the traffic data to be identified and extracts a communication connection pattern from the obtained traffic data.

The whitelist generating unit 12 generates a whitelist including a communication connection pattern group of the learning traffic data of normal communication. At the time of learning, the whitelist generating unit 12 generates a whitelist based on the communication connection pattern group extracted from the learning traffic data by the preprocessing unit 11. The whitelist generating unit 12 outputs the generated whitelist to the abnormal communication identifying unit 13.

The abnormal communication identifying unit 13 identifies the communication that causes an abnormality based on the traffic data to be identified. The abnormal communication identifying unit 13 includes a comparing unit 131 and an identifying unit 132.

The comparing unit 131 determines whether a new communication connection pattern not included in the whitelist is present in the communication connection pattern group extracted by the preprocessing unit 11 by comparing the whitelist with the communication connection pattern group. When a new communication connection pattern not included in the whitelist is present in the communication connection pattern group, the comparing unit 131 adds an ID (identification) to the communication connection pattern group including the new communication connection pattern and outputs the communication connection pattern group to the graph feature amount generating unit 14. It should be noted here that the comparing unit 131 retains the correspondence between the ID and the communication connection pattern group of this traffic data at least until processing on the traffic data to be identified is completed.

The identifying unit 132 retrieves the new communication connection pattern corresponding to the ID of the graph feature amount determined to have an abnormality by the abnormality determining unit 16 from the communication connection pattern group including the new communication connection pattern. Then, the identifying unit 132 identifies the communication corresponding to the retrieved new communication connection pattern as the communication that causes the abnormality. The identifying unit 132 outputs the identified result to a coping device.

The graph feature amount generating unit 14 generates a graph feature amount based on the input communication connection pattern group. At the time of learning, the graph feature amount generating unit 14 generates a graph feature amount based on the communication connection pattern group extracted from the learning traffic data by the preprocessing unit 11. When a communication abnormality is identified, the graph feature amount generating unit 14 generates a graph feature amount based on the communication connection pattern group to which the ID added by the comparing unit 131 and adds, to the generated graph feature amount, the ID identical to the ID added to this communication connection pattern group.

For example, the graph feature amount generating unit 14 generates a communication history graph having the identifiers of the hosts as the vertexes thereof and the communication between the host identifiers as the sides thereof using a communication connection. pattern including a set of the identifier of the host of the communication source and the identifier of the host of the communication destination extracted by the preprocessing unit 11. Subsequently, the graph feature amount generating unit 14 generates a local graph feature amount calculated focusing on the graph structure to a primary adjacent vertex or a secondary adjacent vertex for a certain vertex, based on the communication history graph. Then, the graph feature amount generating unit 14 generates a global graph feature amount calculated focusing on the structure of the while graph for the above vertex based on the communication history graph. Subsequently, the graph feature amount generating unit 14 generates a feature vector for each of the host identifiers using the local graph feature amount and the global graph feature amount together.

The learning unit 15 generates a model 161 by causing a model to learn the graph feature amount generated based on communication connection pattern group of learning traffic data by the graph feature amount generating unit 14 at the time of learning. The learning unit 15 outputs the generated model 161 to the abnormality determining unit 16.

The abnormality determining unit 16 determines whether the graph feature amount generated by the graph feature amount generating unit 14 is normal using the model 161. After receiving the graph feature amount, the model 161 determines whether this graph feature amount is normal or abnormal. The abnormality determining unit 16 outputs, to the abnormal communication identifying unit 13, the ID of the graph feature amount, determined to have an abnormality.

[Processing by the Identifying Device]

Figure 2:
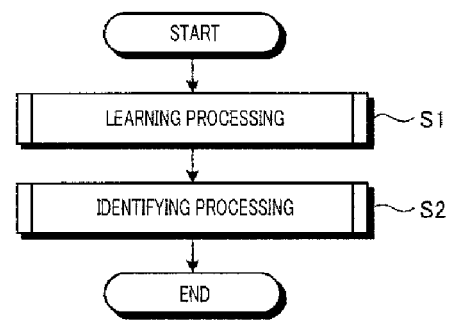
FIG. 2 is a flowchart showing the processing procedure of identifying processing performed by the identifying device in FIG. 1 to identify the communication that causes an abnormality.

Next, the identifying processing performed by the identifying device 10 to identify the communication that causes an abnormality will be described. FIG. 2 is a flowchart showing the processing procedure of identifying processing performed by the identifying device 10 to identify the communication that causes an abnormality in Fig As shown in FIG. 2, the identifying device 10 first performs learning processing that learns the learning traffic data of normal communication (step S1). The identifying device 10 generates a whitelist including a communication connection pattern group of learning traffic data in the learning processing, and performs learning processing for generating a model having learned the graph feature amount of the communication connection pattern group of the learning traffic data.

Subsequently, the identifying device 10 performs identifying processing for identifying the communication that causes an abnormality based on the obtained network traffic data using the whitelist and the model generated in the learning processing (step S2).

[Learning Processing]

Figure 3:
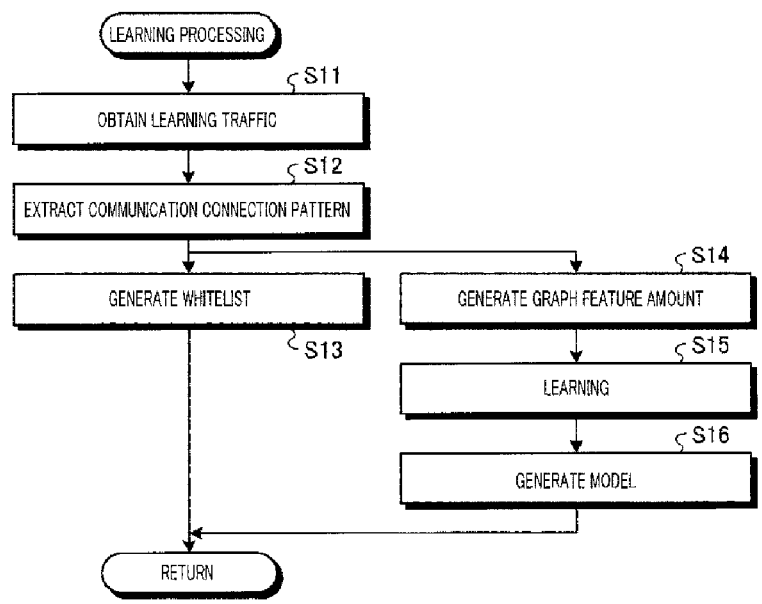
FIG. 3 is a flowchart showing the processing procedure of learning processing in FIG. 2.

Next, the learning processing (step S1) in FIG. 2 will be described. FIG. 3 is a flowchart showing the processing procedure of the learning processing (step S1) in FIG. 2.

As shown in FIG. 3, the preprocessing unit 11 obtains the learning traffic data of normal communication at the time of learning (step S11) and extracts a communication connection pattern from the obtained learning traffic data (step S12). The preprocessing unit 11 outputs the extracted communication connection pattern group to the whitelist generating unit 12 and the graph feature amount generating unit 14. The preprocessing unit 11 extracts traffic data from the learning traffic data for each unit time and outputs the communication connection pattern group included in the extracted traffic data to the graph feature amount generating unit 14. In the learning processing described below, the comparison and the generation of a graph feature amount are performed using the communication connection pattern group included in the traffic data extracted per unit time as one cluster.

The whitelist generating unit 12 generates a whitelist based on the communication connection pattern group extracted from the learning traffic data by the preprocessing unit 11 (step S13) and outputs the generated whitelist to the abnormal communication identifying unit 13.

The graph feature amount generating unit 14 generates the graph feature amount based on the communication connection pattern group included in the traffic data extracted for each unit time (step S14). The graph feature amount generating unit 14 generates the graph feature amount of the communication connection pattern group included in the traffic data extracted for each unit time. Subsequently, the learning unit 15 causes the model to learn the graph feature amount generated based on the communication connection pattern group of the learning traffic data by the graph feature amount generating unit 14 at the time of learning (step S15) and generates the model 161 having learned the graph feature amount (step S16). The learning unit 15 outputs this model 161 to the abnormality determining unit 16.

[Identifying Processing]

Figure 4:
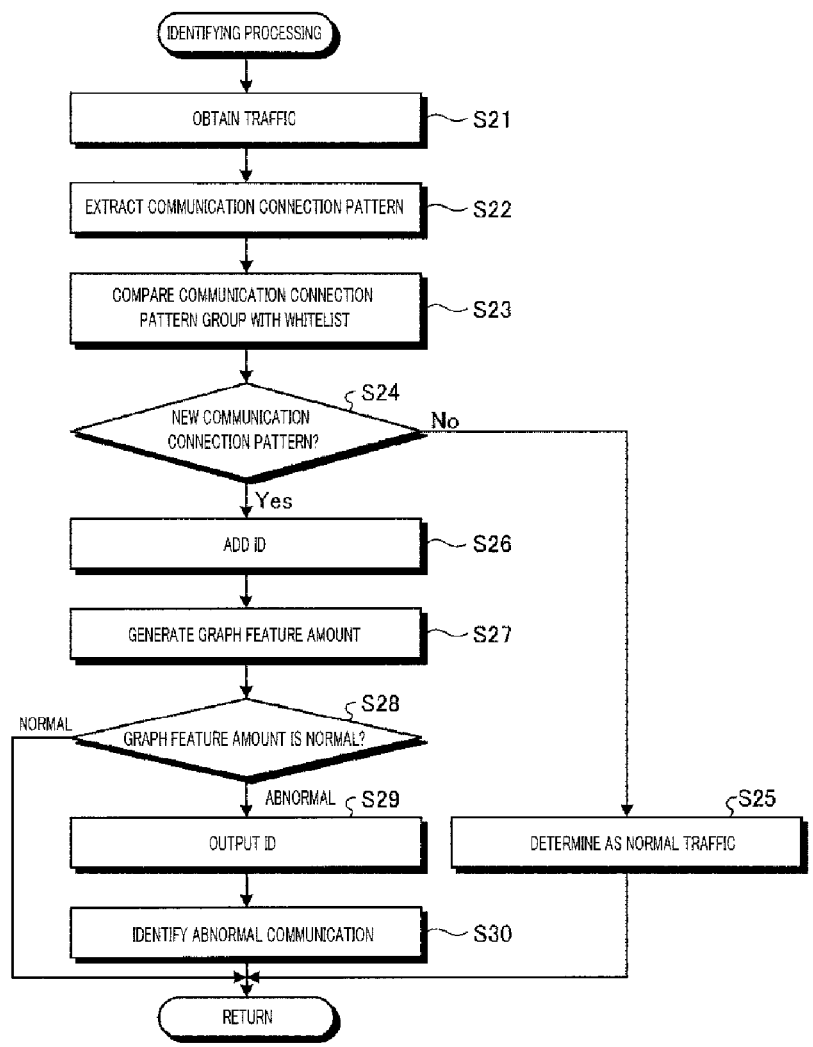
FIG. 4 is a flowchart showing the processing procedure of identifying processing in FIG. 2.

Next, the identifying processing (step S2) in FIG. 2 will be described. FIG. 4 is a flowchart showing the processing procedure of identifying processing in FIG. 2.

As shown in FIG. 4, in the identifying processing, the preprocessing unit 11 obtains traffic data to be identified for a communication abnormality (step S21) and extracts a communication connection pattern from the obtained traffic data ((step S22). The preprocessing unit 11 extracts traffic data for each unit time from the traffic data to be identified and outputs the communication connection pattern group included in the traffic data extracted for each unit time to the abnormal communication identifying unit 13. In the identifying processing described below, the comparison and the generation of a graph feature amount are performed using the communication connection pattern group included in the traffic data extracted per unit time as one cluster.

Subsequently, the comparing unit 131 compares the communication connection pattern group included in the traffic data extracted for each unit time with the whitelist (step S23) and determines whether a new communication connection pattern not included in the whitelist is present in the communication connection pattern group (step S24).

When determining that a new communication connection pattern not included in the whitelist is not present in the communication connection pattern group (No in step S24), the comparing unit 131 determines that the traffic data to be identified is normal (step S25) and. ends the identifying processing.

In contrast, when a new communication connection pattern not included in the whitelist is present in the communication connection pattern group (Yes in step 524), the comparing unit 131 adds an ID to the communication connection pattern group including the new communication connection pattern (step S26) and outputs the communication connection pattern group to the graph feature amount generating unit 14.

The graph feature amount generating unit 14 generates the graph feature amount (step S27) based on the communication connection pattern group to which the ID has been added by the comparing unit 131 and adds, to the generated graph feature amount, the ID identical to the ID added to the communication connection pattern group.

The abnormality determining unit 16 determines whether the graph feature amount generated by the graph feature amount generating unit 14 is normal, using the model 161 (step S28). When determining that the graph feature amount generated by the graph feature amount generating unit 14 is normal (normal in step S28), the abnormality determining unit 16 ends the identifying processing.

In contrast, when determining that the graph feature amount generated by the graph feature amount generating unit 14 is abnormal (abnormal in step 528), the abnormality determining unit 16 outputs the ID added to this graph feature amount to the abnormal communication identifying unit 13 (step S29).

Then, the identifying unit 132 retrieves the new communication connection pattern corresponding to the ID of the graph feature amount determined to have an abnormality by the abnormality determining unit 16 from the communication connection pattern group including the new communication connection pattern, and identifies the communication corresponding to the retrieved new communication connection pattern as the communication that causes the abnormality (step S30).

[Flow of Processing by the Identifying Device]

Figure 5:
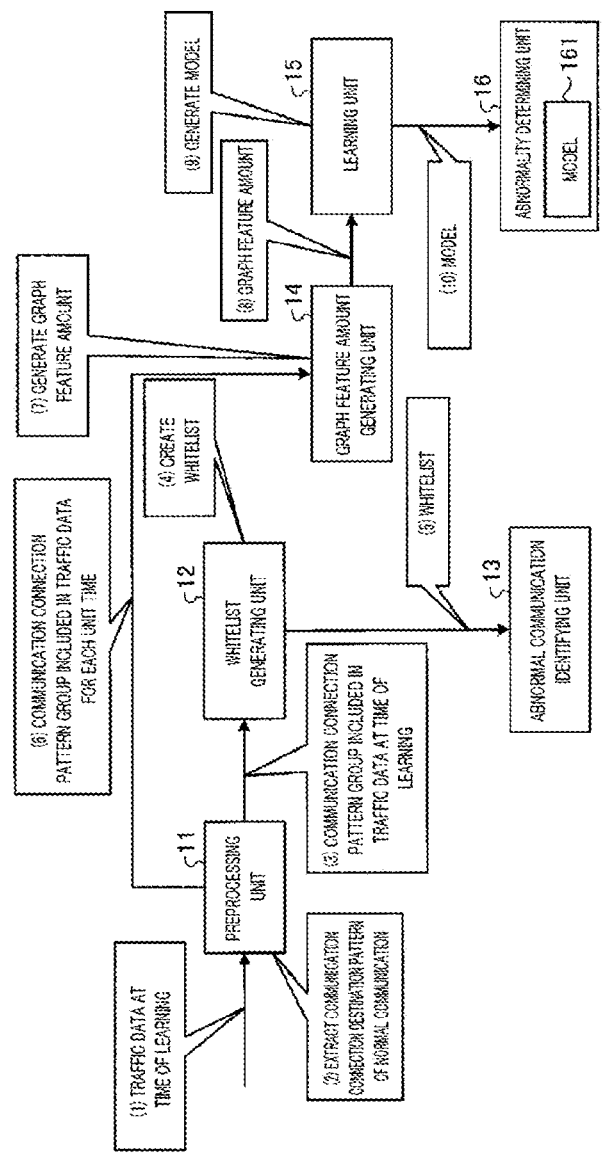
FIG. 5 shows a flow of processing by the identifying device in FIG. 1.
Figure 6:
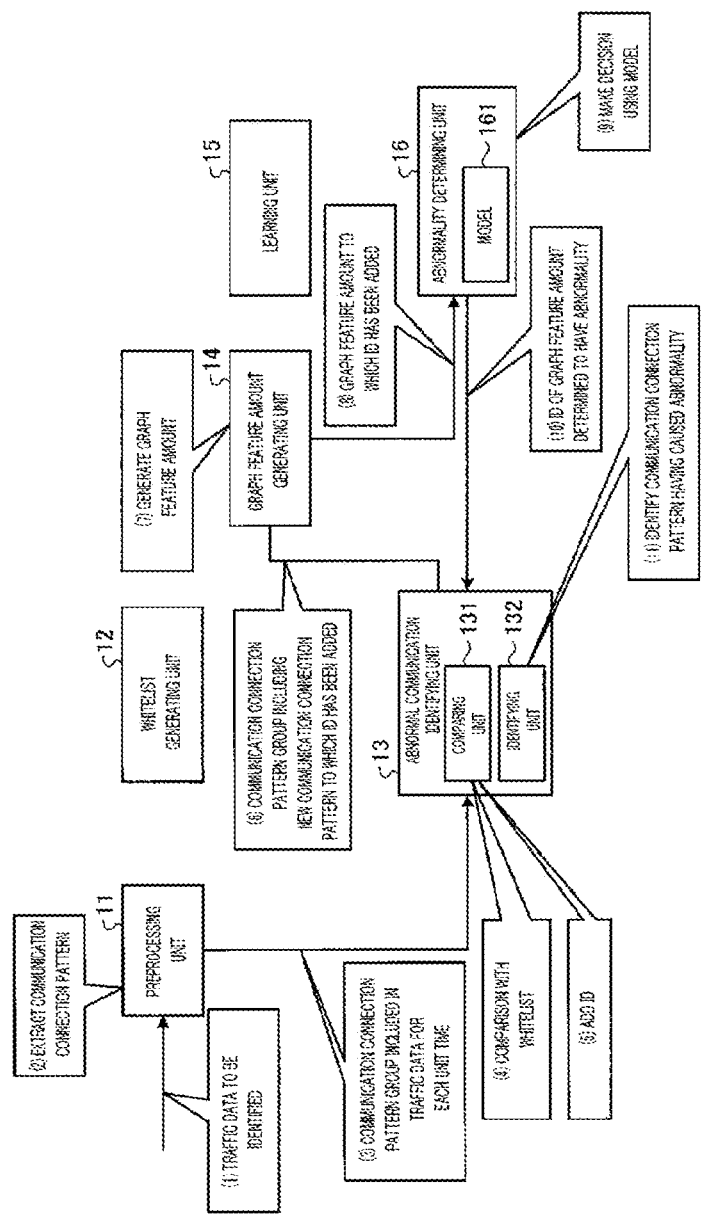
FIG. 6 shows a flow of processing by the identifying device in FIG. 1.

Next, the learning period and the abnormality detection period about a flow of the processing described above will be described more specifically with reference to FIG. 5 and FIG. 6. FIG. 5 and FIG. 6 show a flow of processing by the identifying device in FIG. 1

The following description assumes the conditions described below. First, an infected terminal is present in a LAN (Local Area Network) and a malignant program in the infected terminal generates communication for diffusing invasion. This malignant program performs random portion scanning of IPs (Internet Protocol) of the subnet to which the local infected terminal belongs to find a vulnerable terminal. The port scanning by the malignant program is performed. at intervals of five minutes or more. Next, regarding the LAN environment, a subnet having a general size (/24) is assumed. In addition, it is assumed that an attack such as port scanning is not generated in the LAN at the time of learning.

[Flow of Processing in a Learning Period]

First, the preprocessing unit 11 obtains the learning traffic data of normal communication (see (1) in FIG. 5), extracts the communication connection pattern of normal communication from the obtained traffic data (see in FIG. 5), and outputs the extracted communication connection pattern group to the whitelist generating unit 12 (see (3) in FIG. 5).

For example, the preprocessing unit 11 collects ARP (Address Resolution Protocol) requests within a particular subnet for a learning period (for example, four weeks), and extracts a communication connection pattern including a set of the SrcIP address and the DstIP address of each of the ARP requests. Here, the DstIP address represents the IP address for which a MAC (Media Access Control address) address is resolved. In addition, when IP communication is used, the preprocessing unit 11 collects all IP communication between terminals in the LAN for a learning period (for example, four weeks) and extracts a communication connection pattern including a set of the SrcIP address and. the DstIP address of each IP communication, the destination port number, and the protocol number.

Subsequently, the whitelist generating unit 12 creates a whitelist that records the communication connection pattern group extracted at. the time of learning (see (4) in FIG. 5) and outputs the whitelist to the abnormal communication identifying unit 13 (see (5) in FIG. 5).

In addition, the preprocessing unit 11 outputs the communication connection pattern group included to the traffic data extracted for each unit time to the graph feature amount generating unit 14 (see (6) in 5). For example, the preprocessing unit 11 divides the communication connection pattern group extracted at the time of learning every five minutes.

The graph feature amount generating unit 14 generates a graph feature amount based on the input communication connection pattern group (see (7) in FIG. 5) and outputs the graph feature amount to the learning unit 15 (see (8) in FIG. 5). The learning unit 15 generates or updates the model 161 for each IP using this graph feature amount (see (9) in FIG. 5). The learning unit 15 outputs the model 161 to the abnormality determining unit 16 (see (10) in FIG. 5) and ends the learning processing.

[Flow of Processing in an Abnormality Detection Period]

Next, a flow of processing by the identifying device 10 in an abnormality detection period will be described. The identifying device 10 generates a learning model for each terminal and makes an abnormality decision for each terminal. The identifying device 10 makes an abnormality decision of a terminal only when the terminal communicates with a destination with which the terminal has not communicated yet in the learning period. This is because an abnormality has been probably caused by collapse of the graph structure due to communication generated by another terminal when an abnormality decision is made even through communication with the same destination as in learning period is performed in the identifying device 10.

As shown in FIG. 6, the preprocessing unit 11 first obtains traffic data to be identified (see (1) in FIG. 6), extracts the communication connection pattern from the obtained traffic data (see (2) in FIG. 6), and outputs the communication connection pattern group included in the traffic data extracted for each unit time to the abnormal communication identifying unit 13 (see (3) in FIG. 6).

For example, the preprocessing unit 11 collects ARP requests to be identified and extracts the communication connection pattern from the collected ARP requests every five minutes. In addition, when using IP communication, the preprocessing unit 11 collects all IP communication in the LAN and extracts the communication connection pattern, the destination port number, and the protocol number from the collected IP communication every five minutes.

The comparing unit 131 compares the communication connection pattern group included in the traffic data extracted for each unit time with the whitelist (see (4) in FIG. 6), adds an ID to a new communication connection pattern group not included in the whitelist in the communication connection pattern group (see (5) in FIG. 6), and outputs the new communication connection pattern group to the graph feature amount generating unit 14 (see (6) in FIG. 6).

For example, in the case of an ARP request, the comparing unit 131 compares the communication connection pattern group extracted every five minutes with the whitelist generated in the learning period. The comparing unit 131 adds an ID to one set of a new communication connection pattern not included in the whitelist and a communication connection pattern group including this new communication connection pattern, and outputs the communication connection pattern group to which the ID has been added, to the graph feature amount generating unit 14.

In addition, in the case of IP communication, the comparing unit 131 compares the communication connection pattern group extracted every five minutes with the whitelist generated in the learning period. The comparing unit 131 adds an ID to one set of a new communication connection pattern not included in the whitelist, a communication connection pattern group including this new communication connection pattern, and the destination port number and the protocol number and outputs the communication connection pattern group to which the ID has been added to the graph feature amount generating unit.

The graph feature amount generating unit 14 generates a graph feature amount to which the ID has been added based on the communication connection pattern group to which the ID has been added (see (7) in FIG. 6) and outputs the graph feature amount to the abnormality determining unit 16 (see (8) in FIG. 6).

The abnormality determining unit 16 determines whether the graph feature amount has an abnormality using the model 161 (see (9) in FIG. 6) and, when determining that the graph feature amount is abnormal, outputs the ID of the graph feature amount determined to have the abnormality to the abnormal communication identifying unit 13 (see (10) in FIG. 6).

The identifying unit 132 retrieves the new communication connection pattern corresponding to the ID input by the abnormality determining unit 16 and identifies the new communication connection pattern as the abnormality-causing communication (scan communication) (see (11) in FIG. 6). In addition, in the case of IP communication, the identifying unit 132 retrieves the new communication connection pattern corresponding to the ID input by the abnormality determining unit 16 and identifies this new communication connection pattern as the abnormality-causing communication (scan communication). In addition, the identifying unit 132 can identify the service or application used for scanning by similarly identifying the destination port number and the protocol number of the abnormality-causing communication based on the ID.

[Effects of the Embodiment]

As described above, when identifying the communication that causes an abnormality, the identifying device 10 according to the embodiment extracts, from the extracted traffic data, a set of the communication source identifier for identifying the host of the communication source and the communication destination identifier for identifying the host of the communication destination.

Then, when determining that a new communication connection pattern not included in the whitelist is present in the communication connection pattern group by comparing the whitelist with the extracted communication connection pattern group, the identifying device 10 adds an ID to the communication connection pattern group including the new communication connection pattern. As described above, the identifying device 10 according to the embodiment adds an ID so that a new communication. connection pattern group not included in the whitelist can be identified.

Then, the identifying device 10 adds, to the graph feature amount generated from the new communication connection pattern group, the ID identical to the ID added to the communication connection pattern group and then determines whether the graph feature amount generated by the generating unit is normal using the model. Since the identifying device 10 according to the embodiment performs the generation and decision of the graph feature amount only on the communication connection pattern group including a new communication connection pattern not included in the whitelist as described above, the processing time can be reduced as compared with the case in which the identifying device 10 performs such processing on all communication connection patterns.

Subsequently, the identifying device 10 retrieves the new communication connection pattern corresponding to the ID of the graph feature amount determined to have an abnormality from all new communication connection patterns to which IDs have been added. The identifying device 10 according to the embodiment can identify the communication connection pattern corresponding to the graph feature amount determined to have an abnormality by adding an ID to the communication connection pattern group including a new communication connection pattern not included in the whitelist identifiable so as to make the new communication connection pattern as described above. The identifying device 10 identifies the communication corresponding to the retrieved new communication connection pattern as the communication that causes an abnormality and outputs the identification result to the coping device.

Accordingly, the identifying device 10 generates and determines a graph feature amount after adding an ID to the communication connection pattern group not included in the whitelist and identifies the communication connection pattern group corresponding to the graph feature amount determined to have an abnormality as the communication that causes an abnormality using the ID. Accordingly, the identifying device 10 can easily identify the communication that causes an abnormality when detecting an abnormality of network traffic based on the graph feature amount. In addition, the identifying device 10 can identify the communication that causes an abnormality, thereby enabling the identification of the service or application having generated abnormal communication and the identification of the scan host to which infection possibly spreads.

In addition, in the learning period, the identifying device 10 generates a whitelist including the communication connection pattern of traffic data of normal communication and generates a model by causing the model 161 to learn the graph feature amount of the communication connection pattern group of traffic data of normal communication. As a result, the identifying device 10 can obtain an appropriate whitelist and the model 161 for making an accurate abnormality decision by learning the communication connection pattern of traffic data of normal communication. Then, the identifying device 10 can accurately identify the communication that causes an abnormality using the whitelist and the model 161 obtained as described above.

[System Structure etc.]

Since the components of individual devices shown are represented as the functional concept, the components do not need to have the physical structures as shown. That is, the specific forms in which individual devices are distributed or integrated are not limited to the shown examples and all or parts thereof may be functionally or physically distributed or integrated in any unit depending on the various loads or use situations. In addition, all or any parts of the processing functions of individual devices may be achieved by a CPU or programs analyzed and executed by the CPU or may be achieved as wired-logic hardware. The identifying device 10 according to the embodiment may be achieved by a computer and programs and the programs may be stored in a recording medium or provided via a network.

In addition, of individual processes described in the embodiment, all or parts of the processes described to be executed automatically may be executed manually or all or parts of the processes to be executed manually may be executed automatically in a known method. Other than the above, information including the processing procedures, the control procedures, the specific names, and various types of data and parameters shown in the document or drawings described above may be changed arbitrarily unless otherwise specified.

[Program]

Figure 7:
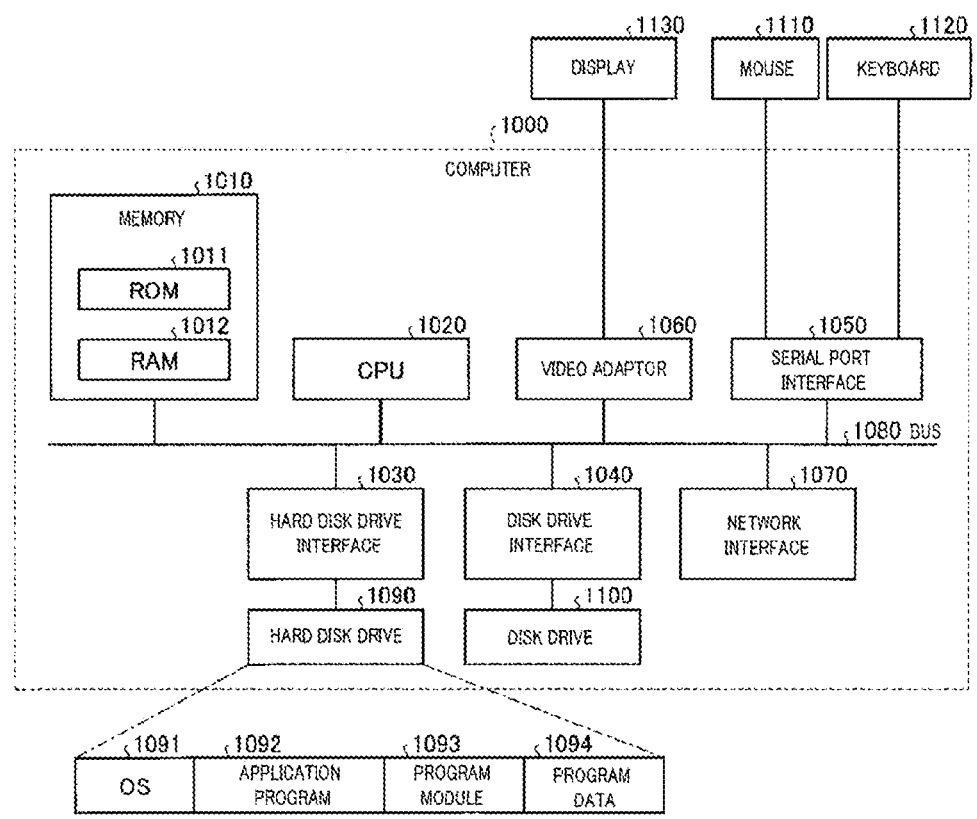
FIG. 7 shows one example of a computer that achieves the identifying device by executing a program.

FIG. 7 shows one example of a computer that achieves the identifying device 10 by executing programs. A computer 1000 has, for example, a memory 1010 and a CPU 1020. In addition, the computer 1000 has a hard disk drive interface 1030, a disk drive interface 1040, a serial port interface 1050, a video adaptor 1060, and a network interface 1070. These units are connected via a bus 1080.

The memory 1010 includes a ROM (Read Only Memory) 1011 and a RAM 1012. The ROM 1011 stores a boot program such as, for example, a BIOS (Basic Input Output System). The hard disk drive interface 1030 is connected to a hard dish drive 1090. The disk drive interface 1040 is connected to a disk drive 1100. A removable storage medium such as, for example, a magnetic disc or an optical disc is inserted into the disk drive 1100. The serial port interface 1050 is connected to, for example, a mouse 1110 and a keyboard 1120. The video adaptor 1060 is connected to, for example, a display 1130.

The hard disk drive 1090 stores, for example, an OS 1091, an application program 1092, a program module 1093, and program data 1094. That is, the programs that defines the individual processes of the identifying device 10 are implemented as the program module 1093 including codes that can be executed by the computer 1000. The program module 1093 is stored in, for example, the hard disk drive 1090. The program module 1093 for executing processing similar to, for example, the functional structure of the identifying device 10 is stored in the hard disk drive 1090. It should be noted here that the hard disk drive 1090 may be replaced with an SSD (Solid State Drive).

In addition, the design data used for the above processes of the embodiment is stored as the program data 1094 in, for example, the memory 1010 or the hard disk drive 1090. Then, the CPU 1020 reads the program module 1093 and the program data 1094 stored in the memory 1010 or the hard disk drive 1090 to the RAM 1012 as necessary and executes it.

It should be noted here that the program module 1093 and the program data 1094 do not need to be stored in the hard disk drive 1090 and may be stored in, for example, a removable storage medium, and the program module 1093 and the program data 1094 may be read by the CPU 1020 via the disk drive 1100 or the like. Alternatively, the program module 1093 and the program data 1094 may be stored in another computer connected via a network (such as a LAN or a WAN (Wide Area Network)). Then, the program.

module 1093 and the program data 1094 may be read by the CPU 1020 via the network interface 1070 from another computer.

Although an embodiment to which the invention devised by the inventor is applied is described above, the present invention is not limited by descriptions and drawings of the embodiment, which are parts of the disclosure of the present invention. That is, other embodiments, examples, and operation techniques devised by those skilled in the art based on the embodiment are all included in the scope of the present invention.

REFERENCE SIGNS LIST

10 Identifying device
11 Preprocessing unit
12 Whitelist generating unit
13 Abnormal communication identifying unit
14 Graph feature amount generating unit
15 Learning unit
16 Abnormality determining unit
131 Comparing unit
132 Identifying unit
161 Model

The invention claimed is:

1. A computer-implemented method for determining aspects of a network, the method comprising:
    receiving traffic data;
    determining a plurality of communication connection patterns, wherein each communication connection pattern includes a set of:
        a communication source identifier for identifying a communication source, and
        a communication destination identifier for identifying a communication destination;
    comparing a whitelist with the plurality of communication connection patterns, wherein the whitelist includes a communication connection pattern of traffic data under a normal communication;
    assigning, based on the compared plurality of communication connection patterns, an identifier to the plurality of communication connection patterns, wherein the compared communication connection patterns include a new communication connection pattern from the plurality of communication connection pattern not on the white list;
    generating, based on the plurality of communication connection patterns with the assigned identifier, a graph feature amount;
    assigning the identifier of the plurality of communication connection patterns to the generated graph feature amount;
    determining normalcy of the generated graph feature amount using a trained model on graph feature amount based on the communication connection patterns; and
    retrieving, from the plurality of communication connection patterns including a new communication connection pattern, the new communication connection pattern corresponding to an identifier of graph feature amount that has been determined as anomaly in communication; and
    determining the retrieved new communication connection pattern as a communication causing anomaly.

2. The computer-implemented method of claim 1, the method further comprising:
    receiving the traffic data in a predetermined time interval; and
    determining, based at least on the received traffic data, normalcy of the traffic data.

3. The computer-implemented method of claim 2, the method further comprising:
    generating the whitelist, wherein the whitelist includes a communication connection pattern based on the traffic data under the normal communication;
    generating, based on training of the graph feature amount of the plurality of data connection patterns of the traffic data under the normal communication, the trained model;
    receiving the traffic data under the normal communication;
    determining the communication connection pattern from the received traffic data under the normal communication; and
    generating, based on the plurality of communication connection patterns received from the traffic data under the normal communication, the communication connection pattern under the normal communication.

4. The computer-implemented method of claim 2, wherein the traffic data relate to an address resolution protocol (ARP) request inside a predetermined subnet or an Internet Protocol communication between terminals.

5. The computer-implemented method of claim 2, the method further comprising:
    generating a plurality of models for learning the graph feature amount, wherein the plurality of models determines anomaly of the network based on the graph feature amount, and wherein at least one model of the plurality of models is associated with a terminal connected to the network.

6. The computer-implemented method of claim 2, wherein the anomaly relates to data communications from the terminal to a destination with which the terminal has not yet communicated during the predetermined time interval.

7. The computer-implemented method of claim 2, the method further comprising:
    updating the new communication connection pattern using a destination port address and a protocol number of the received traffic; and
    identifying, based on the destination port address and the protocol number of the received data traffic, an application program causing the anomaly, wherein the anomaly relates to a periodic port scanning of one or more terminals over the network.

8. A system for determining aspects of a network, the system comprises:
    a processor; and
    a memory storing computer-executable instructions that when executed by the processor cause the system to:
        receive traffic data;
        determine a plurality of communication connection patterns, wherein each communication connection pattern includes a set of:
            a communication source identifier for identifying a communication source, and
            a communication destination identifier for identifying a communication destination;
        compare a whitelist with the plurality of communication connection patterns, wherein the whitelist includes a communication connection pattern of traffic data under a normal communication;
        assign, based on the compared plurality of communication connection patterns, an identifier to the plurality of communication connection patterns, wherein the compared communication connection patterns include a new communication connection pattern from the plurality of communication connection pattern not on the white list;

generate, based on the plurality of communication connection patterns with the assigned identifier, a graph feature amount;

assign the identifier of the plurality of communication connection patterns to the generated graph feature amount;

determine normalcy of the generated graph feature amount using a trained model on graph feature amount based on the communication connection patterns; and retrieve, from the plurality of communication connection patterns including a new communication connection pattern, the new communication connection pattern corresponding to an identifier of graph feature amount that has been determined as anomaly in communication; and determine the retrieved new communication connection pattern as a communication causing anomaly.

9. The system of claim 8, the computer-executable instructions when executed further causing the system to:
receive the traffic data in a predetermined time interval; and
determine, based at least on the received traffic data, normalcy of the traffic data.

10. The system of claim 9, the computer-executable instructions when executed further causing the system to:
generate the whitelist, wherein the whitelist includes a communication connection pattern based on the traffic data under the normal communication;
generate, based on training of the graph feature amount of the plurality of data connection patterns of the traffic data under the normal communication, the trained model;
receive the traffic data under the normal communication;
determine the communication connection pattern from the received traffic data under the normal communication; and
generate, based on the plurality of communication connection patterns received from the traffic data under the normal communication, the communication connection pattern under the normal communication.

11. The system of claim 9, wherein the traffic data relate to an address resolution protocol (ARP) request inside a predetermined subnet or an Internet Protocol communication between terminals.

12. The system of claim 9, the computer-executable instructions when executed further causing the system to:
generate a plurality of models for learning the graph feature amount, wherein the plurality of models determines anomaly of the network based on the graph feature amount, and wherein at least one model of the plurality of models is associated with a terminal connected to the network.

13. The system of claim 9, wherein the anomaly relates to data communications from the terminal to a destination with which the terminal has not yet communicated during the predetermined time interval .

14. The system of claim 9, the computer-executable instructions when executed further causing the system to:
update the new communication connection pattern using a destination port address and a protocol number of the received traffic; and
identify, based on the destination port address and the protocol number of the received data traffic, an application program causing the anomaly, wherein the anomaly relates to a periodic port scanning of one or more terminals over the network.

15. A computer-readable non-transitory recording medium storing computer-executable instructions that when executed by a processor cause a computer system to:
receive traffic data;
determine a plurality of communication connection patterns, wherein each communication connection pattern includes a set of:
a communication source identifier for identifying a communication source, and
a communication destination identifier for identifying a communication destination;
compare a whitelist with the plurality of communication connection patterns, wherein the whitelist includes a communication connection pattern of traffic data under a normal communication;
assign, based on the compared plurality of communication connection patterns, an identifier to the plurality of communication connection patterns, wherein the compared communication connection patterns include a new communication connection pattern from the plurality of communication connection pattern not on the white list;
generate, based on the plurality of communication connection patterns with the assigned identifier, a graph feature amount;
assign the identifier of the plurality of communication connection patterns to the generated graph feature amount;
determine normalcy of the generated graph feature amount using a trained model on graph feature amount based on the communication connection patterns; and
retrieve, from the plurality of communication connection patterns including a new communication connection pattern, the new communication connection pattern corresponding to an identifier of graph feature amount that has been determined as anomaly in communication; and
determine the retrieved new communication connection pattern as a communication causing anomaly.

16. The computer-readable non-transitory recording medium of claim 15, the computer-executable instructions when executed further causing the system to:
receive the traffic data in a predetermined time interval; and
determine, based at least on the received traffic data, normalcy of the traffic data.

17. The computer-readable non-transitory recording medium of claim 16, the computer-executable instructions when executed further causing the system to:
generate the whitelist, wherein the whitelist includes a communication connection pattern based on the traffic data under the normal communication;
generate, based on training of the graph feature amount of the plurality of data connection patterns of the traffic data under the normal communication, the trained model;
receive the traffic data under the normal communication;
determine the communication connection pattern from the received traffic data under the normal communication; and
generate, based on the plurality of communication connection patterns received from the traffic data under the normal communication, the communication connection pattern under the normal communication.

18. The computer-readable non-transitory recording medium of claim 16, wherein the traffic data relate to an address resolution protocol (ARP) request inside a predetermined subnet or an Internet Protocol communication between terminals.

19. The computer-readable non-transitory recording medium of claim 16, the computer-executable instructions when executed further causing the system to:
generate a plurality of models for learning the graph feature amount, wherein the plurality of models determines anomaly of the network based on the graph feature amount, and wherein at least one model of the plurality of models is associated with a terminal connected to the network.

20. The computer-readable non-transitory recording medium of claim 16, the computer-executable instructions when executed further causing the system to:
update the new communication connection pattern using a destination port address and a protocol number of the received traffic; and
identify, based on the destination port address and the protocol number of the received data traffic, an application program causing the anomaly, wherein the anomaly relates to a periodic port scanning of one or more terminals over the network.

* * * * *